(12) United States Patent
Ooki (10) Patent No.: US 12,244,778 B2
(45) Date of Patent: Mar. 4, 2025

(54) IMAGE READING APPARATUS THAT EMITS DIFFERENT LIGHT AMOUNTS AND IMAGE FORMING SYSTEM

(71) Applicant: CANON KABUSHIKI KAISHA, Tokyo (JP)

(72) Inventor: Kenji Ooki, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/398,294

(22) Filed: Dec. 28, 2023

(65) Prior Publication Data
US 2024/0236252 A1 Jul. 11, 2024

(30) Foreign Application Priority Data
Jan. 5, 2023 (JP) ................. 2023-000653

(51) Int. Cl.
*H04N 1/04* (2006.01)
*H04N 1/00* (2006.01)
*H04N 1/03* (2006.01)
*H04N 1/10* (2006.01)
*H04N 1/203* (2006.01)

(52) U.S. Cl.
CPC .......... *H04N 1/00806* (2013.01); *H04N 1/03* (2013.01); *H04N 1/1061* (2013.01); *H04N 1/2038* (2013.01)

(58) Field of Classification Search
None
See application file for complete search history.

(56) References Cited

U.S. PATENT DOCUMENTS

| 11,069,068 B2 | 7/2021 | Shimamura | |
| 11,308,318 B2 | 4/2022 | Shimamura et al. | |
| 2007/0076242 A1* | 4/2007 | Kanai | H04N 1/32561 358/1.14 |
| 2019/0362498 A1* | 11/2019 | Shimamura | H04N 1/00167 |
| 2020/0137259 A1* | 4/2020 | Totsuka | H04N 1/00716 |
| 2021/0306496 A1* | 9/2021 | Sunako | H04N 1/40056 |

FOREIGN PATENT DOCUMENTS

| JP | 2002271582 A | 9/2002 |
| JP | 2012034168 A | 2/2012 |
| JP | 2013021626 A | 1/2013 |

* cited by examiner

*Primary Examiner* — Dung D Tran
(74) *Attorney, Agent, or Firm* — ROSSI, KIMMS & McDOWELL LLP (57) ABSTRACT

An image reading apparatus includes a platen on which an original is to be placed, a scanner unit configured to emit light to the original placed on the platen and receive light reflected from the original, to thereby read an image of the original, and at least one processor configured to control the scanner unit to generate an image signal representing the image based on a result of reading the image of the original by the scanner unit, wherein, in a case in which a plurality of originals are placed on the platen, the at least one processor is configured to control the scanner unit to emit the light with a first light amount in a case where the plurality of originals are originals having a first type, and emit the light with a second light amount.

12 Claims, 9 Drawing Sheets

| 703 | | W | H |
|---|---|---|---|
| APPLICABLE ORIGINAL SIZE | L SIZE | 127 | 89 |
| | POSTCARD | 148 | 100 |
| | KG SIZE | 152 | 102 |
| | 2L SIZE | 178 | 127 |

IMAGE READING APPARATUS THAT EMITS DIFFERENT LIGHT AMOUNTS AND IMAGE FORMING SYSTEM

BACKGROUND OF THE INVENTION

Field of the Invention

The present disclosure relates to an image reading apparatus that reads an image from an original and an image forming system including such an image reading apparatus and an image forming apparatus.

Description of the Related Art

An image forming system including an image reading apparatus and an image forming apparatus can be used as a copying machine or a multifunction peripheral. In recent years, there have been achieved image reading apparatus having a function in which, after a plurality of originals are placed on a platen, images of the plurality of originals are read at a time to output a plurality of image signals individually representing the images of the respective originals. In this function, edges of the image of each original are extracted, thereby preventing the image from being determined to be integral with the image of another original. Such a function is called "multi-crop function."

With the multi-crop function, respective images of a plurality of small-sized originals can be read at a time. In a case where thin and lightweight originals such as receipts are placed on a platen, the originals may float off the platen due to occurrence of curls and wrinkles. For that reason, the platen is provided with a pressing plate that can be opened and closed. The originals on the platen are read while being pressed down by the pressing plate, thereby preventing curls and wrinkles.

However, in a case where the pressing plate is closed, it may become difficult to extract the edges of the image of an original. In order to facilitate the extraction of the edges of the image of an original, there has been proposed an image reading apparatus that reads the image of an original by reducing an amount of light emitted at a time of reading the original (U.S. Pat. No. 11,069,068). In the present specification, a method of reading the image of an original while reducing the amount of light in such a manner is referred to as "dark reading."

In multi-cropping, a plurality of originals placed on the platen are read at a time to cut out images of the respective originals, and hence the dark reading is advantageous. However, a read image obtained by the dark reading is an overall dark image, and hence information on an image close to black is missing. For that reason, tone reproducibility (reproduction characteristics of the image of an original in terms of tone) of an image such as a photograph that has been subjected to the dark reading decreases. That is, in a case where a plurality of originals including a photograph are read in the multi-cropping, image quality of an image read from the photograph decreases.

The decrease in tone reproducibility is noticeable in a gradation portion from black to white. In the dark reading, the entire read image decreases in brightness, and hence a white portion of an original becomes slightly gray and a black portion thereof becomes darker black due to the decrease in tone reproducibility. Therefore, in the dark reading, a dynamic range of the brightness that can be read by the image reading apparatus becomes narrower, and the number of tone levels of the brightness that can be sampled decreases, thereby causing colors close to black in the read image to be crushed. For example, in a case where a gray image having eight tone levels is subjected to the dark reading, the read image has two tone levels due to the dynamic range becoming narrower, and the gray image becomes a black read image. The read image that has become black is no longer reproduced, and hence black-side information is missing.

Further, in a case where the original is a photograph, photographic paper or photo paper has a larger basis weight and a larger paper thickness than those of plain paper, and hence shadows are likely to appear at the edges of the read image. For that reason, in a case of extracting the edges of the read image, image processing for edge enhancement or the like is performed, thereby being capable of extracting the edges with accuracy. However, in order to prevent a decrease in tone characteristics, it is required to read the photograph with a sufficient light amount without reducing the amount of light emitted to the original.

In this manner, the image reading apparatus is required to switch the amount of light emitted to the original in a case of reading the original depending on the type of an original to be read. In view of the above-mentioned problem, the present disclosure has a main object to provide an image reading apparatus that can read an image from an original under optimal conditions depending on the type of the original.

SUMMARY OF THE INVENTION

An image reading apparatus according to one aspect of the present disclosure includes a platen on which an original is to be placed, a scanner unit configured to emit light to the original placed on the platen and receive light reflected from the original, to thereby read an image of the original, and at least one processor configured to control the scanner unit to generate an image signal representing the image based on a result of reading the image of the original by the scanner unit, wherein, in a case in which a plurality of originals are placed on the platen, the at least one processor is configured to control the scanner unit to emit the light with a first light amount in a case where the plurality of originals are originals having a first type, and emit the light with a second light amount in a case where the plurality of originals are originals having a second type which is different from the first type, and wherein the original having the second type is smaller in thickness than the original having the first type, or wherein the original having the second type is a text original and the original having the first type is a photographic original.

An image forming system according to another aspect of the present disclosure includes an image forming apparatus configured to form an image on a sheet, and an image reading apparatus configured to read an image from an original, and generate an image signal representing the read image, wherein the image forming apparatus is configured to acquire the image signal from the image reading apparatus, and form, on the sheet, an image based on the acquired image signal, wherein the image reading apparatus includes a platen on which an original is to be placed, a scanner unit configured to emit light to the original placed on the platen and receive light reflected from the original, to thereby read an image of the original, and at least one processor configured to control the scanner unit to generate an image signal representing the image based on a result of reading the image of the original by the scanner unit, wherein, in a case in which a plurality of originals are placed on the platen, the at least one processor is configured to control the scanner unit to emit the light with a first light amount in a case where the plurality of originals are originals having a first type, and emit the light with a second light amount in a case where the plurality of originals are originals having a second type which is different from the first type, wherein the original having the second type is smaller in thickness than the original having the first type, or the original having the second type is a text original and the original having the first type is a photographic original.

Further features of the present invention will become apparent from the following description of exemplary embodiments (with reference to the attached drawings).

DESCRIPTION OF THE EMBODIMENTS

Now, referring to the accompanying drawings, description is given of at least one exemplary embodiment of the present disclosure.

Figure 1:
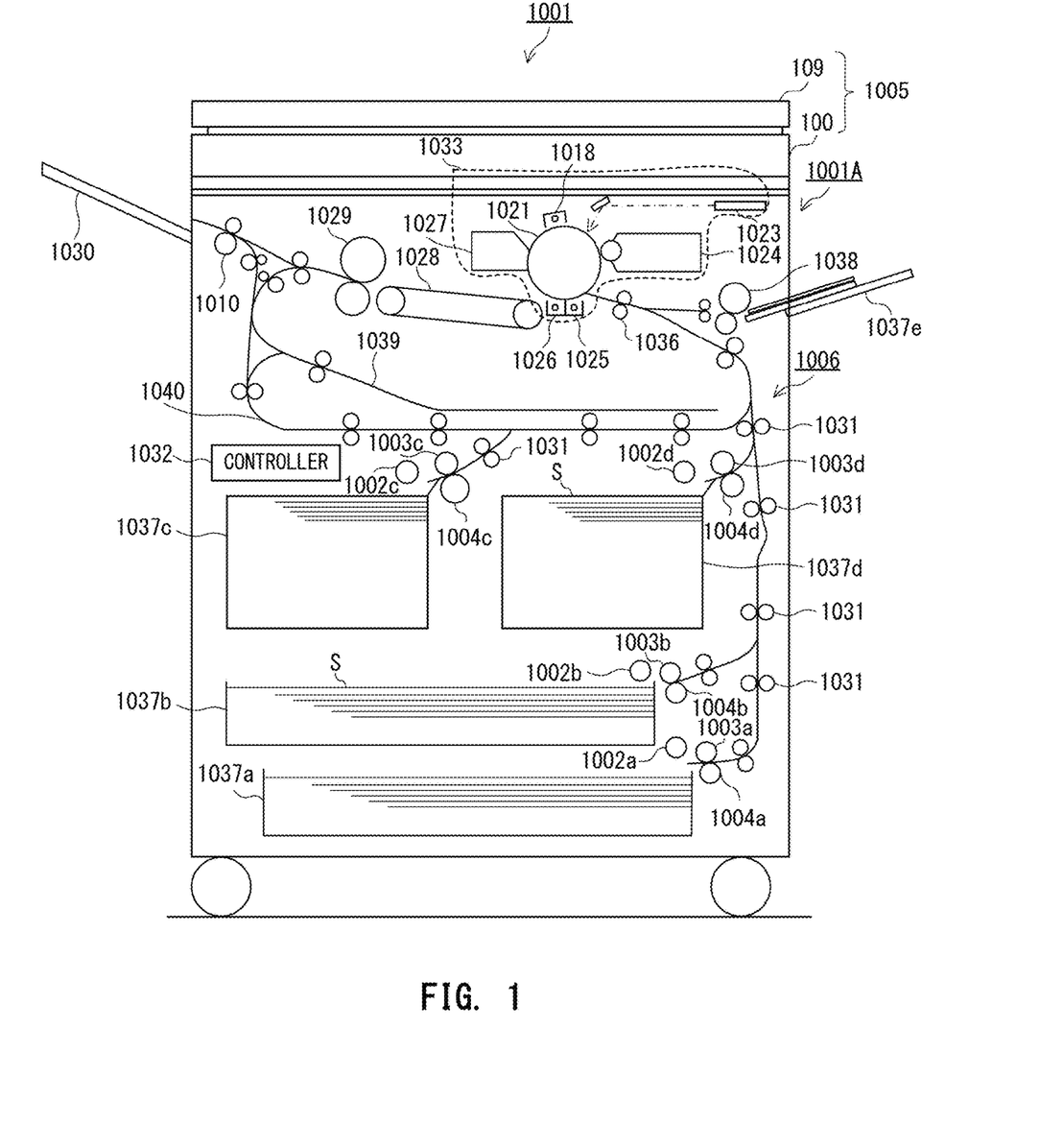
FIG. 1 is a configuration diagram of an image forming system.

FIG. 1 is a configuration diagram of an image forming system including an image reading apparatus and an image forming apparatus according to the at least one embodiment. An image forming system 1001 includes an image reading apparatus 1005 mounted above an image forming apparatus 1001A, and is achieved by, for example, a copying machine or a multifunction peripheral (MFP). The image forming system 1001 is provided with an operation display, which is described later, as a user interface including an input interface and an output interface.

The image reading apparatus 1005 includes a scanner 100 and a pressing plate 109. The pressing plate 109 is attached to the scanner 100 so as to be openable and closable. The scanner 100 reads an image from an original by optically scanning the original. The image reading apparatus 1005 transmits an image signal representing the read image of the original to a controller 1032 of the image forming apparatus 1001A. The image forming apparatus 1001A forms an image on a sheet S, which is a recording medium, through use of the controller 1032 based on the acquired image signal.

The image forming apparatus 1001A includes an image forming unit 1033 that forms an image on the sheet S, a sheet feeder 1006 that feeds the sheet S to the image forming unit 1033, and a fixing device 1029. The sheet S is conveyed from the sheet feeder 1006 to the image forming unit 1033 to have the image transferred thereonto, and then has the image fixed thereto by the fixing device 1029 to be delivered to a delivery tray 1030.

The sheet feeder 1006 includes a plurality of sheet containers 1037a, 1037b, 1037c, and 1037d that can contain sheets S having mutually different sizes. The sheets S contained in the sheet containers 1037a, 1037b, 1037c, and 1037d are fed from the sheet containers 1037a, 1037b, 1037c, and 1037d by corresponding pickup rollers 1002a, 1002b, 1002c, and 1002d, respectively. The fed sheets S are separated one by one by corresponding feed rollers 1003a, 1003b, 1003c, and 1003d and retard rollers 1004a, 1004b, 1004c, and 1004d, respectively, to be conveyed to corresponding conveyance roller pairs 1031. The sheets S are sequentially passed to the plurality of conveyance roller pairs 1031 arranged along a sheet conveyance path to be conveyed to a registration roller pair 1036 arranged in the sheet conveyance path.

The sheet feeder 1006 also includes a manual feed tray 1037e. The sheet S placed on the manual tray 1037e by a user is fed into the image forming apparatus 1001A by a feeding roller 1038 to be conveyed to the registration roller pair 1036.

The registration roller pair 1036 stops a leading edge of the sheet S to correct skew feeding. The registration roller pair 1036 resumes conveying the sheet S to the image forming unit 1033 in accordance with progress of a toner image forming process being performed by the image forming unit 1033.

The image forming unit 1033 in the at least one embodiment employs an electrophotographic method involving a photosensitive drum 1021. The image forming unit 1033 may be configured to form an image through use of, for example, an ink-jet method or an offset printing method.

The photosensitive drum 1021 is a drum-shaped photosensitive member having a photosensitive layer on a surface thereof, and is rotatable about a drum shaft with a conveying direction of the sheet S set as a rotation direction. A charging device 1018, an exposure device 1023, a developing device 1024, a transfer charging device 1025, a separation charging device 1026, and a cleaner 1027 are arranged around the photosensitive drum 1021. The charging device 1018 uniformly charges the surface of the photosensitive drum 1021. The exposure device 1023 exposes the charged surface of the photosensitive drum 1021 to light based on the image signal input from the image reading apparatus 1005 or the like to form an electrostatic latent image on the photosensitive drum 1021.

The developing device 1024 contains a two-component developer including a toner and a carrier. The developing device 1024 supplies a charged toner to the photosensitive drum 1021 and causes the charged toner to adhere to an electrostatic latent image. Thus, the electrostatic latent image is developed, and a toner image is formed on the surface of the photosensitive drum 1021. The toner image borne on the photosensitive drum 1021 is transferred onto the sheet S by a bias electric field formed by the transfer charging device 1025. The sheet S is conveyed from the registration roller pair 1036 to the transfer charging device 1025 in accordance with a timing at which the toner image is formed.

The sheet S onto which the toner image has been transferred is separated from the photosensitive drum 1021 by a bias electric field formed by the separation charging device 1026, and is conveyed to the fixing device 1029 by a pre-fixing conveyor 1028. The cleaner 1027 removes an adhering substance such as a transfer residual toner remaining on the photosensitive drum 1021 without being transferred onto the sheet S, thereby enabling the photosensitive drum 1021 to be ready for the subsequent image forming operation.

The fixing device 1029 nips and conveys the sheet S through use of a roller pair. At that time, the fixing device 1029 applies heat and pressure to the sheet S, to thereby melt the toner image and fix the toner image to the sheet S. After the fixation of the toner image, image formation on the sheet S is completed. The sheet S on which the image has been formed is delivered through a delivery roller pair 1010 to the delivery tray 1030 that protrudes outward from the image forming apparatus 1001A.

In a case where duplex printing is performed, the sheet S on which the image has been formed on one side (first side) passes through the fixing device 1029 and is then conveyed to a reverser 1039 in order to form an image on the other side (second side). The sheet S has an image forming side reversed from the first side to the second side by the reverser 1039, and is conveyed to a double-sided conveyor 1040. The double-sided conveyor 1040 conveys, to the registration roller pair 1036, the sheet S of which the image forming side has been reversed. The sheet S is conveyed from the registration roller pair 1036 to the image forming unit 1033 to have an image formed on the second side, and is then delivered to the delivery tray 1030.

Figure 2A:
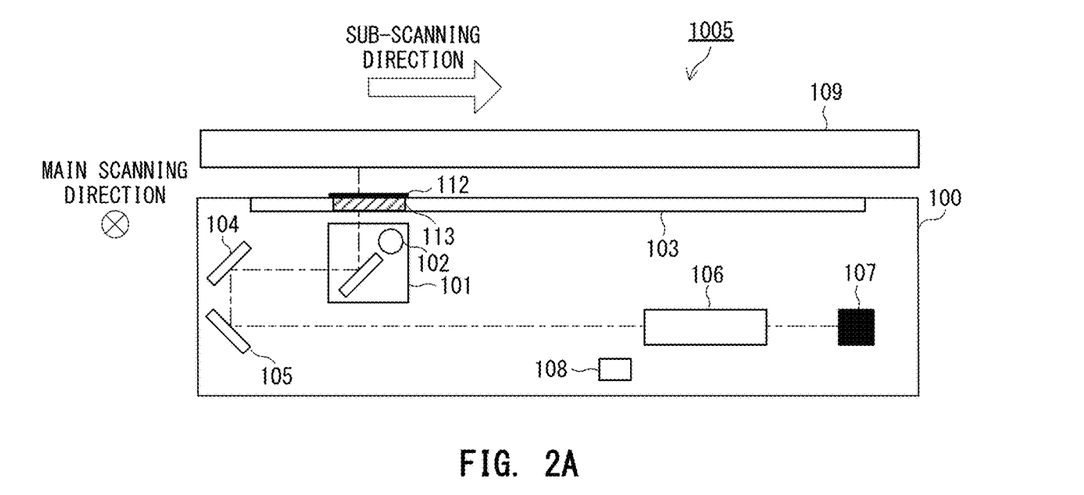
FIG. 2A and FIG. 2B are explanatory diagrams of a configuration of an image reading apparatus.
Figure 2B:
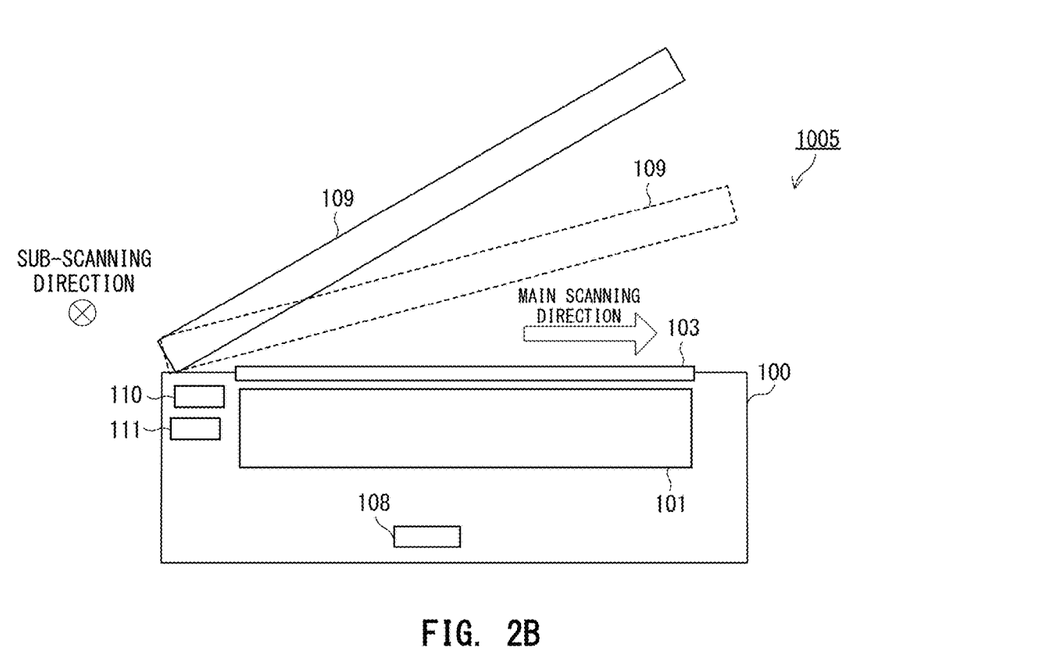

FIG. 2A and FIG. 2B are explanatory diagrams of a configuration of the image reading apparatus 1005. FIG. 2A is an illustration of the image reading apparatus 1005 viewed from the front of FIG. 1, and FIG. 2B is an illustration of the image reading apparatus 1005 viewed from the left side of FIG. 1.

The scanner 100 includes a scanner unit 101 including a lamp 102, a platen 103, folding mirrors 104 and 105, a lens 106, and a line sensor 107 that converts a read image into an electrical signal. The scanner 100 includes a reflection type sensor 108 that detects an original placed on the platen 103. The pressing plate 109 is openable and closable with respect to the platen 103. In a case where the original is to be read, the pressing plate 109 is set to a closed state so as to fix the original by pressing the original onto the platen 103.

The scanner unit 101 illuminates the original placed on the platen 103 with light emitted by the lamp 102 that is a light source. The lamp 102 illuminates the original with light having a linear shape in the depth direction of FIG. 2A. Light reflected by the original passes through a mirror inside the scanner unit 101, the folding mirrors 104 and 105, and the lens 106 to be imaged on a light-receiving surface of the line sensor 107. The line sensor 107 is a reader configured such that a plurality of light-receiving elements are arrayed in a linear shape in the depth direction of FIG. 2A. The line sensor 107 photoelectrically converts the reflected light received by each of the light-receiving elements to generate an analog read signal that is an electrical signal representing the read image.

In FIG. 2A, a direction of the light emitted by the lamp 102 and an array direction of the light-receiving elements of the line sensor 107 are both the depth direction of FIG. 2A. Therefore, the depth direction of FIG. 2A is a main scanning direction of the scanner 100. A sub-scanning direction orthogonal to the main scanning direction is the left-right direction of FIG. 2A. The scanner unit 101 is movable in the sub-scanning direction, and at a time of image reading, illuminates the original with light while moving in the sub-scanning direction.

The platen 103 is provided with a reference white plate 113. The reference white plate 113 provides a reference white color to be used at the time of image reading on the scanner unit 101 side, and serves as a size index plate on the pressing plate 109 side. An edge of the size index plate serves as an abutment 112 to be used for the original in the sub-scanning direction at a time of placing the original. The abutment 112 is set as a position of a base end of the original in the sub-scanning direction.

The scanner 100 is provided with detection sensors 110 and 111 for detecting an opening-and-closing angle of the pressing plate 109. The detection sensor 110 detects a state in which the opening-and-closing angle of the pressing plate 109 is 25 degrees, and the detection sensor 111 detects a state in which the opening-and-closing angle of the pressing plate 109 is 5 degrees.

Figure 3:
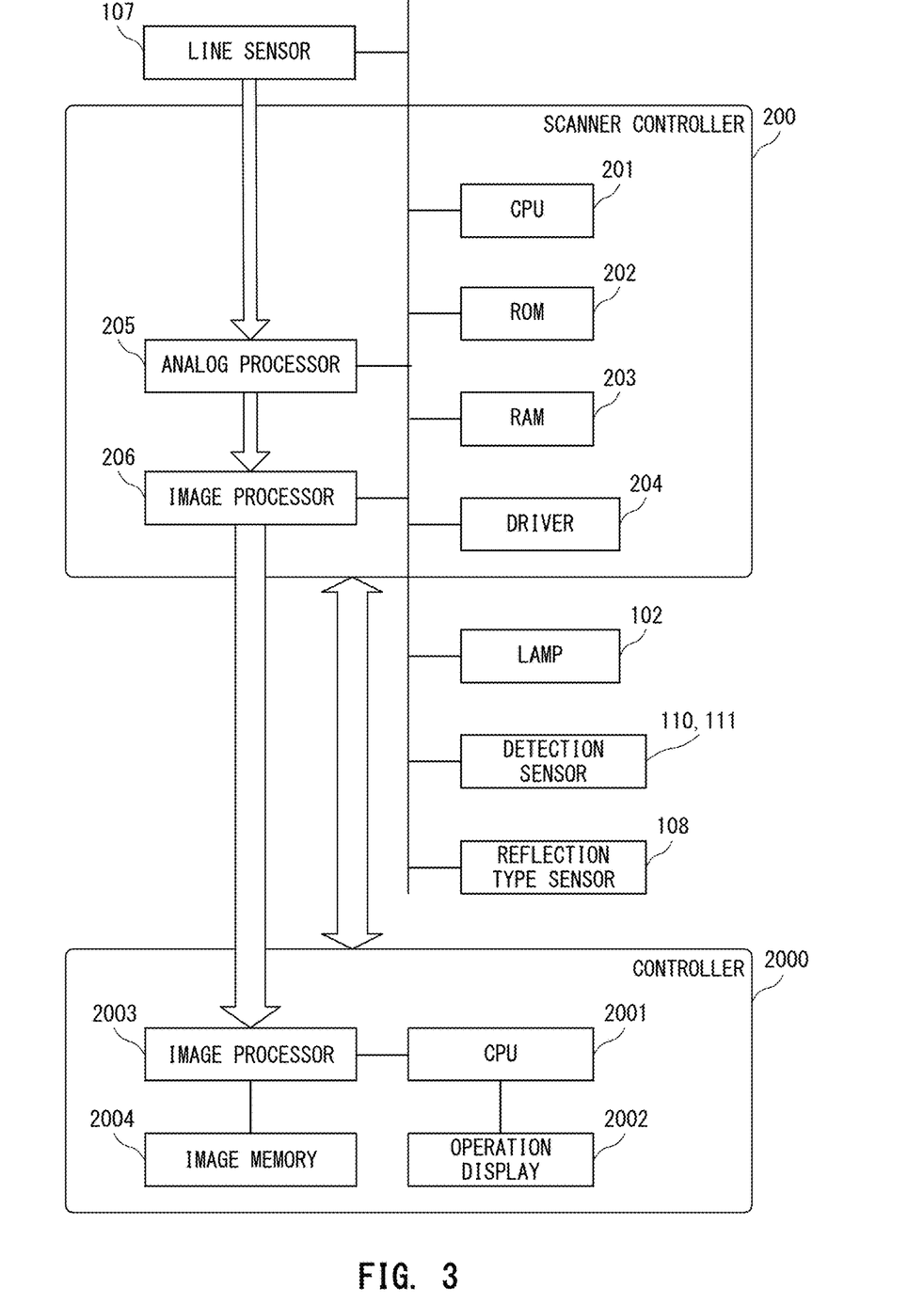
FIG. 3 is an explanatory diagram of a scanner controller.

FIG. 3 is an explanatory diagram of a scanner controller that controls an operation of the scanner 100. The scanner controller 200 is an information processing device including a central processing unit (CPU) 201, a read only memory (ROM) 202, and a random access memory (RAM) 203. The CPU 201 controls the operation of the scanner 100 by executing a computer program stored in the ROM 202. The RAM 203 provides a work area to be used in a case where the CPU 201 executes processing.

In addition, the scanner controller 200 includes a driver 204 for moving the scanner unit 101 in the sub-scanning direction, an analog processor 205, and an image processor 206. The driver 204 is controlled by the CPU 201 to move the scanner unit 101 at the time of image reading. The analog processor 205 is controlled by the CPU 201 to perform analog processing on the analog read signal output from the line sensor 107. Through processing performed by the analog processor 205, the analog read signal is converted into a digital read signal. The image processor 206 is controlled by the CPU 201 to perform image processing on the digital read signal output from the analog processor 205 to generate an image signal representing the image of the original.

The scanner controller 200 described above is connected to the lamp 102, the detection sensors 110 and 111, the reflection type sensor 108, and the line sensor 107. The CPU 201 reads an image from an original by controlling the lamp 102 and the line sensor 107. The CPU 201 acquires detection results from the detection sensors 110 and 111 and the reflection type sensor 108. The CPU 201 detects the opening-and-closing angle of the pressing plate 109 based on the detection results acquired from the detection sensors 110 and 111. The CPU 201 can detect presence or absence of an original on the platen 103 based on the detection result acquired from the reflection type sensor 108. A size of the original on the platen 103 can be automatically detected based on the detection result acquired from the reflection type sensor 108. In a case where a plurality of reflection type sensors 108 are provided, an original size can be detected with higher accuracy.

The scanner controller 200 is connected to a controller 2000 so as to enable communication therebetween. In particular, the image processor 206 is directly connected to the controller 2000. The controller 2000 is a main controller that controls an operation of the image forming system 1001, and is, for example, the controller 1032. The scanner controller 200 performs a reading operation for an original in accordance with an instruction from the controller 2000. To that end, the controller 2000 includes a CPU 2001, an operation display 2002, an image processor 2003, and an image memory 2004.

The CPU 2001 controls an operation of the image forming apparatus 1001A to perform the above-mentioned image forming processing and form an image on the sheet S. The image processor 2003 acquires the image signal from the image processor 206 of the scanner controller 200, and performs the image processing on the image signal under the control of the CPU 2001. The image signal subjected to the image processing is stored in the image memory 2004. The CPU 2001 controls an operation of each component of the image forming apparatus 1001A based on the image signal stored in the image memory 2004 to form an image on the sheet S based on the image signal.

The operation display 2002 is a user interface as described above, and can transmit instructions and settings input through the input interface to the CPU 2001, and also output various kinds of information through the output interface under the control of the CPU 2001. Further, the output interface of the operation display 2002 includes a display that displays a setting screen for performing various settings.

In a case where the image of the original placed on the platen 103 is to be read, the CPU 201 first moves the scanner unit 101 to a position at which the reference white plate 113 can be read by the driver 204, and reads the reference white plate 113. The CPU 201 turns on the lamp 102 at a time of reading the reference white plate 113, and causes the line sensor 107 to receive the light reflected by the reference white plate 113. The CPU 201 performs publicly known shading correction based on the analog read signal representing a result of reading the reference white plate 113 that has been output from the line sensor 107.

After the shading correction, the CPU 201 causes the driver 204 to move the scanner unit 101 in the sub-scanning direction with the lamp 102 turned on, and causes the line sensor 107 to read the image of the original with the abutment 112 used as the base end of the original.

The line sensor 107 transmits the analog read signal representing the read image of the original to the analog processor 205. The analog processor 205 performs predetermined processing on the analog read signal to convert the analog read signal into a digital read signal. The analog processor 205 transmits the generated digital read signal to the image processor 206. The image processor 206 performs predetermined processing on the digital read signal to generate an image signal representing the read image, and transmits the image signal to the controller 2000. In a case where the image reading apparatus 1005 is used alone, the image signal is output to an external device such as a personal computer through a predetermined communication interface or a portable recording medium.

The controller 2000 causes the image processor 2003 to perform predetermined image processing on the image signal acquired from the scanner controller 200, and stores the image signal subjected to the image processing in the image memory 2004. In a case where copy processing is to be performed, the CPU 2001 controls each component of the image forming apparatus 1001A to print, on the sheet S, an image that is based on the image signal stored in the image memory 2004.

<Multi-Crop Function>

An operation of the image reading apparatus 1005 in a multi-crop mode is described. In multi-cropping, a plurality of originals are placed on the platen 103, and images of the respective originals can be read individually in one reading operation. Thus, in the multi-crop mode, a plurality of image signals representing the individual images of the plurality of original originals are generated.

The user places a plurality of originals on the platen 103, closes the pressing plate 109, and uses the operation display 2002 to instruct reading processing using the multi-cropping. The CPU 2001 of the controller 2000 instructs the scanner controller 200 to perform the reading processing using the multi-cropping in accordance with the instruction for the reading processing that has been acquired from the operation display 2002. In response thereto, the CPU 201 of the scanner controller 200 causes the image reading apparatus 1005 to perform the reading processing in multi-crop mode.

The image reading apparatus 1005 reads a plurality of originals placed on the platen 103 at a time, and outputs a plurality of image signals representing the respective images. A reading range at a time of reading the originals and an extraction range of the images of the originals are set to an entire surface of the platen 103. An analog read signal representing a result of reading the entire surface of the platen 103 is converted into a digital read signal by the analog processor 205, and is transmitted to the image processor 206. The image processor 206 extracts the respective images of the plurality of originals from the digital read signal representing an image of the entire surface of the platen 103, and generates an image signal of each image. In this manner, the reading processing using the multi-cropping is performed.

Figure 4A:
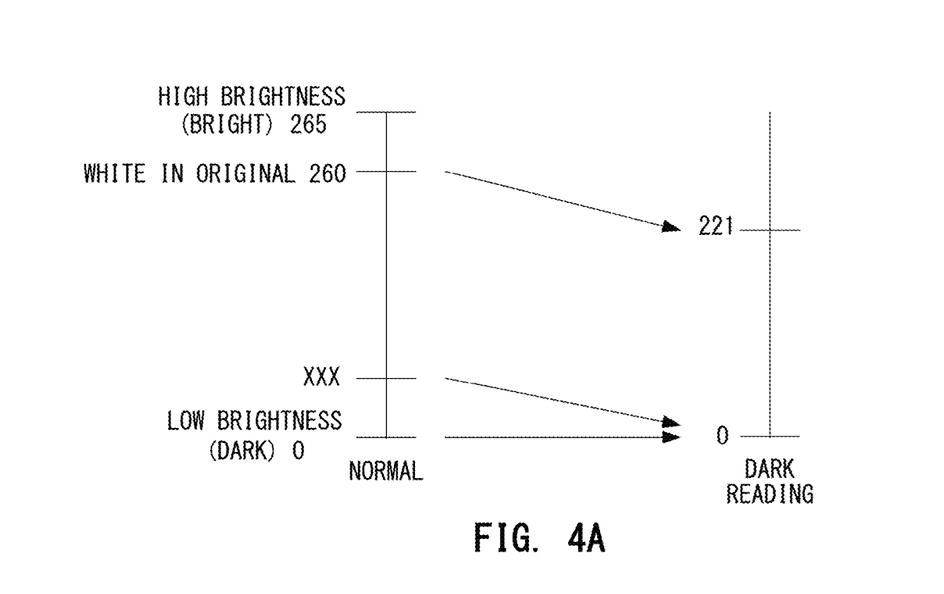
FIG. 4A and FIG. 4B are explanatory diagrams of a decrease in tone reproducibility due to dark reading.
Figure 4B:
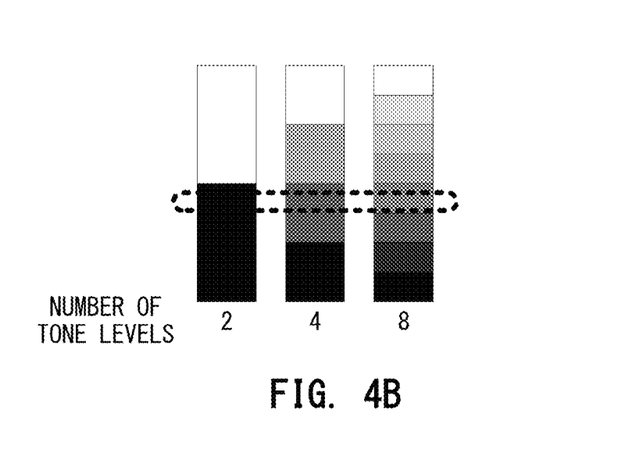

In the multi-cropping, it is advantageous to use dark reading in which an amount of light emitted from the lamp 102 at the time of reading the originals is reduced. However, in the dark reading, tone reproducibility decreases. FIG. 4A and FIG. 4B are explanatory diagrams of a decrease in tone reproducibility due to the dark reading.

FIG. 4A is an illustration of a brightness obtained as a result of reading an image in each of a case of a normal light amount and a case of reducing the light amount due to the dark reading. In the dark reading, the brightness is lowered overall, and a white portion of the original is read in a slightly gray color, and a black portion thereof is read in a darker black-side color. In this manner, in the dark reading, a dynamic range of the brightness that can be read by the image reading apparatus 1005 becomes narrower, and hence an image that has been brought to the black side is crushed. FIG. 4B is an illustration of the number of tone levels and smoothness of gradation. A gray (region indicated by the dotted line) image originally having eight tone levels becomes black because the dynamic range of the brightness becomes narrower (because the number of tone levels becomes two) due to the dark reading. The image that has been crushed to become black cannot be reproduced, for example, on the sheet S during copying.

In a case where the original is a photograph, photographic image quality cannot be maintained unless the tone reproducibility is maintained. For that reason, the dark reading is not appropriate in a case where a photograph is read in the multi-cropping. When there is a photograph in a plurality of originals to be read in the multi-cropping, it is preferred to avoid the dark reading and perform normal reading processing using a larger amount of light than in the dark reading.

Figure 5A:
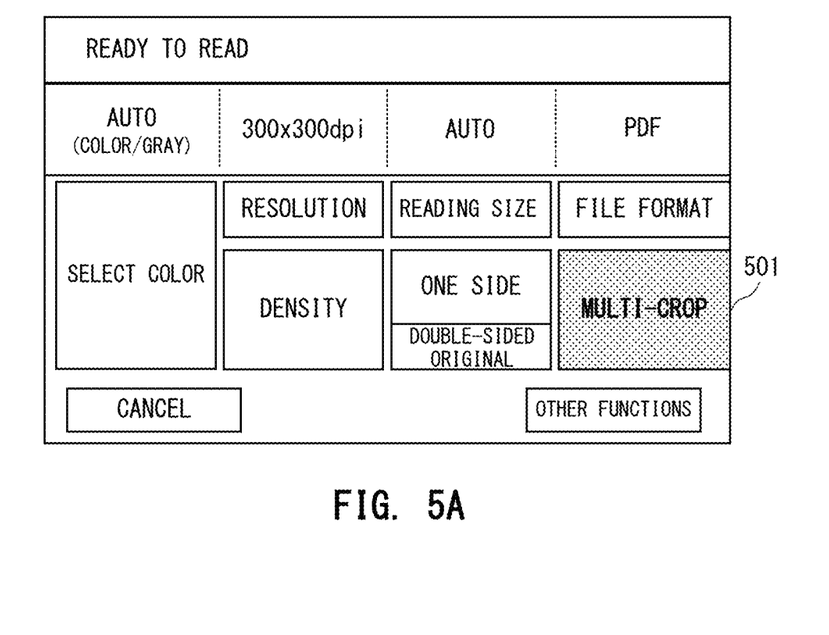
FIG. 5A and FIG. 5B are exemplary views of a setting screen.
Figure 5B:
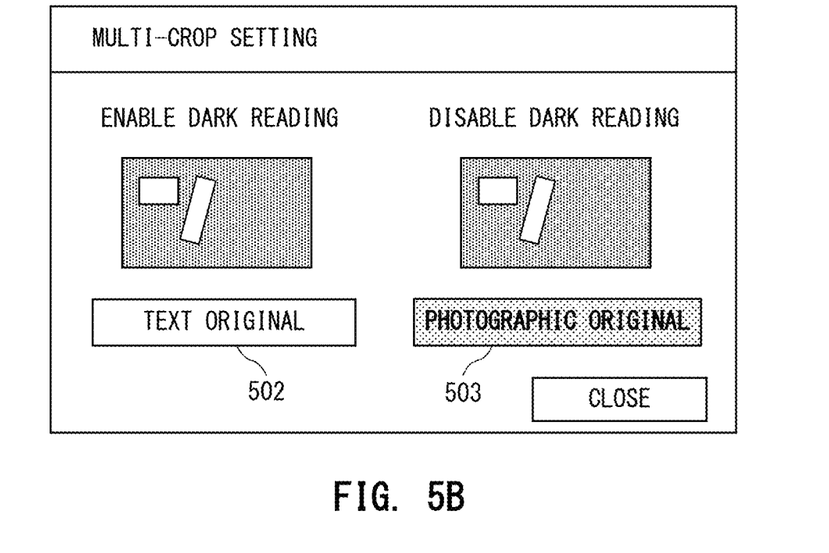

FIG. 5A and FIG. 5B are exemplary views of a setting screen for setting such a multi-crop mode. FIG. 5A exemplifies an initial screen displayed on the operation display 2002. In a case where the user uses the operation display 2002 to select the "multi-crop" button 501 from the initial screen, the display of the operation display 2002 transitions to a setting screen for the multi-cropping exemplified in FIG. 5B.

On the setting screen for the multi-cropping, options for types of originals for a multi-cropping operation are displayed. In this case, a text original having characters printed thereon and a photographic original having a photographic image printed thereon can be selected as the types of the originals, and hence a "text original" selection button 502 and a "photographic original" selection button 503 are displayed on the setting screen in a selectable manner. In a case where the user selects any one of the selection buttons through the operation display 2002, the corresponding one of the "text original" and the "photographic original" is selected in the multi-crop mode. For example, when at least one of a plurality of originals is a photographic original, the user selects the "photographic original".

In a case where the "photographic original" is selected, it is possible to optimally read the photographic original without performing the dark reading due to a thickness of a photograph, a business card, a driver's license, or the like and in consideration of tone characteristics. That is, the photographic original is selected in a case where a paper thickness of a sheet used for the original is larger than a predetermined paper thickness and it is required to maintain image quality of a read image. In a case where the "text original" is selected, it is possible to appropriately read an outline of the original by performing the dark reading while preventing floating or movement of the original, such as a receipt, which is small in paper thickness or is curled. That is, the text original is selected in a case where the paper thickness of the sheet used for the original is equal to or smaller than the predetermined paper thickness.

Figure 6A:
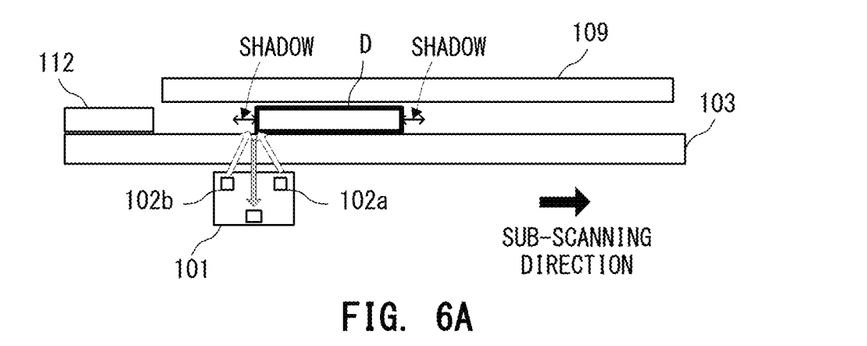
FIG. 6A and FIG. 6B are explanatory diagrams of a case in which a thick original is read.
Figure 6B:
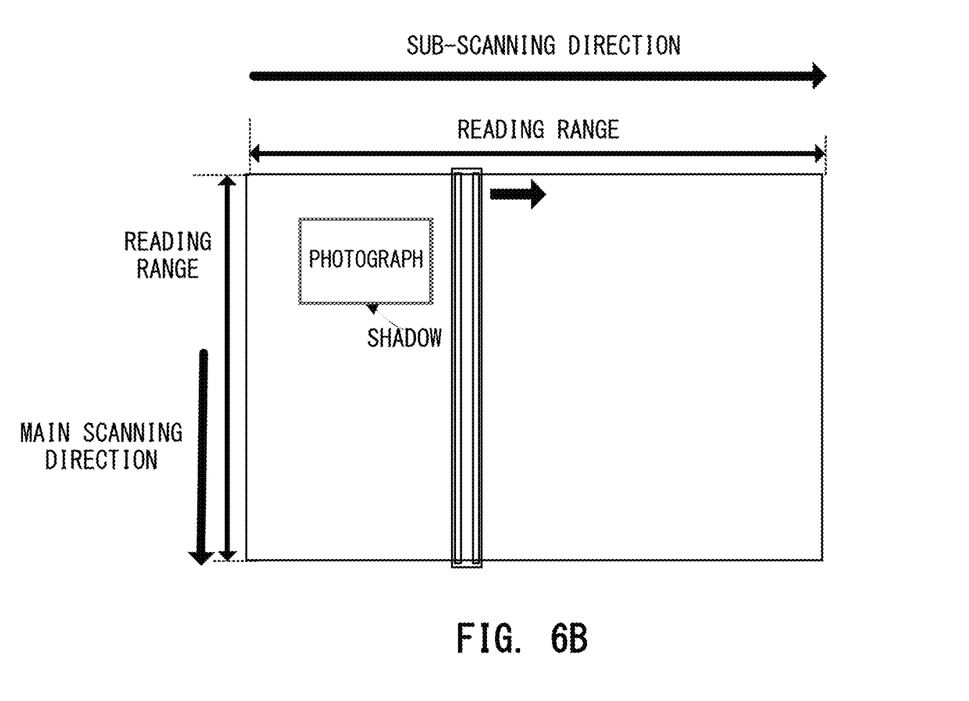

Further, an original such as a photograph, a business card, or a driver's license is thick, and hence a distance corresponding to the thickness is created between the pressing plate 109 and the platen 103. Thus, shadows of the outline of the original appear between the pressing plate 109 and the platen 103. FIG. 6A and FIG. 6B are explanatory diagrams of a case in which a thick original is read.

FIG. 6A is an illustration of a state in which there occurs a spacing corresponding to a thickness of an original D between the pressing plate 109 and the platen 103. The scanner unit 101 includes, as the lamp 102, a lamp 102*a* that emits light from the right side and a lamp 102*b* that emits light from the left side. In this case, light from the lamp 102*a*, which is a light source on the right side, is emitted onto the left side of the original D, but does not illuminate a left-side outline part of the original D, and hence a shadow appears on the left side. In a case where the scanner unit 101 moves in the sub-scanning direction to read the original D, light from the lamp 102*b*, which is a light source on the left side, is similarly emitted onto the right side of the original D, but does not illuminate a right-side outline part of the original D, and hence a shadow appears on the right side.

Referring to FIG. 6B, shadows that appear along an outline of the photographic original under the state of FIG. 6A are described. In the photographic original, even when the dark reading is not performed, image processing for edge enhancement or the like is performed on the generated shadows of the outline, to thereby extract the outline from the read image. The image processing for edge enhancement performed in this case is, for example, processing for sharpening an outline portion of the read image by steepening a gradient of an image density of the outline portion of the read image.

In the multi-crop mode, the reading operation for originals is performed with the pressing plate 109 closed. This can prevent the light from the lamp 102 from illuminating the user through the platen 103 at the time of reading images from the originals.

After the user uses the setting screen of FIG. 5B to set the type of originals to be read in the multi-crop, the user places the originals on the platen 103, and instructs to start reading the originals through use of the operation display 2002. In response thereto, the CPU 2001 acquires information representing the set type of the originals from the operation display 2002, stores the information in the RAM 203, and causes the image reading apparatus 1005 to perform the reading operation corresponding to the setting.

Figure 7:
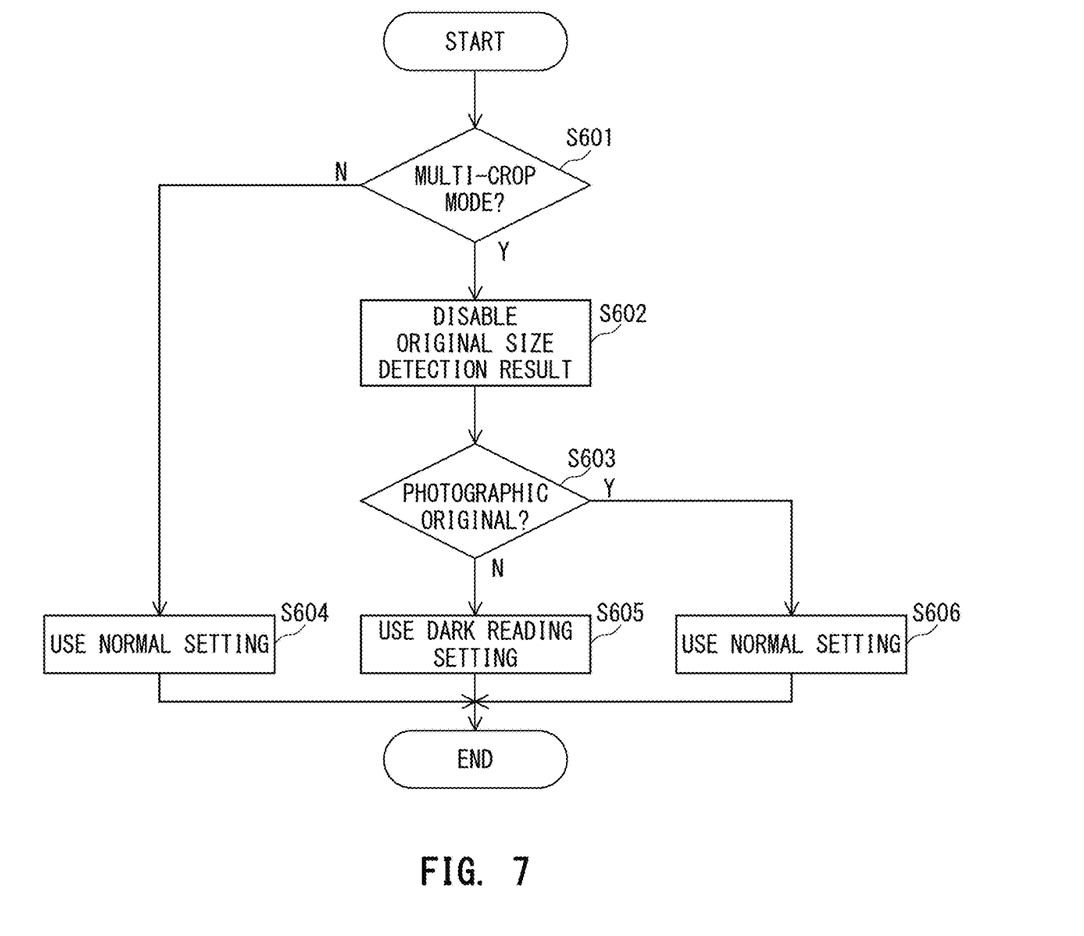
FIG. 7 is a flow chart for illustrating a reading operation.

FIG. 7 is a flow chart for illustrating the reading operation to be performed by the image reading apparatus 1005. Processing of this flow is started in a case where the user places originals on the platen 103 and instructs to start reading the originals through use of the operation display 2002.

The CPU 2001 examines whether or not the multi-crop mode is set (Step S601). In a case where the multi-crop mode is not set (N in Step S601), the CPU 2001 reads an image of an original through use of a normal light amount setting (Step S604). At a time of reading the image of the original through use of the normal light amount setting, before the reading is started, a size of the original is set by automatic detection of the size of the original placed on the platen 103 or by user's input using the operation display 2002. The automatic detection of the size of the original is performed based on, for example, the detection result acquired from the reflection type sensor 108. Therefore, an image reading range has been determined at a reading start time point. The CPU 2001 reads the image of the original within the determined image reading range.

In a case where the multi-crop mode is set (Y in Step S601), the CPU 2001 temporarily nullifies the image reading range that has been determined before the reading is started in a normal procedure (Step S602). This is because the entire surface of the platen 103 is to be set as the reading range in the multi-crop mode. For that reason, the user may place a plurality of originals at any positions on the platen 103. The CPU 2001 examines which of the photographic original and the text original is set for the originals to be read (Step S603).

In a case where the photographic original is set for the originals (Y in Step S603), the CPU 2001 does not perform the dark reading in order to read the plurality of originals including a thick original such as a photograph, a business card, or a driver's license. In a case where the dark reading is not performed, the photographic original can be read under conditions optimal for extracting the outline of the image of the original. In this case, the CPU 2001 reads the images of the originals through use of the normal light amount setting (Step S606).

In a case where the text original is set for the originals (N in Step S603), the CPU 2001 performs the dark reading in order to read a plurality of originals including an original using a thin sheet such as a receipt. In a case where the dark reading is performed, it is possible to read the text original under conditions optimal for extracting the outline of the image of the original while preventing curling of the original, floating of the original from the platen 103, and movement of the original. In this case, the CPU 2001 reads the images of the originals through use of a dark reading setting in which the light amount is reduced than in a normal time (Step S605).

In the above-mentioned manner, the amount of light emitted at the time of reading an original is set to the normal light amount (first light amount) in a case where the multi-cropping is not performed and in a case where an image is read from an original using a thick sheet such as a photograph in the multi-cropping. The light amount is set to a light amount (second light amount) reduced from the normal light amount in a case where an image is read from an original using a thin sheet such as a receipt in the multi-cropping.

In a case of the photographic original in the multi-crop mode, the dark reading is not performed, and an original size in the read image is set based on the size of each original. For the photographic original in the multi-crop mode, the entire surface of the platen 103 is read, and the outline of each original is detected from the read image of the entire surface by performing the image processing for edge enhancement or the like. It is also possible to reliably extract the image of each original by designating the size of the original to be extracted by a default setting. The designation of the size of the photographic original is described below.

Figure 8A:
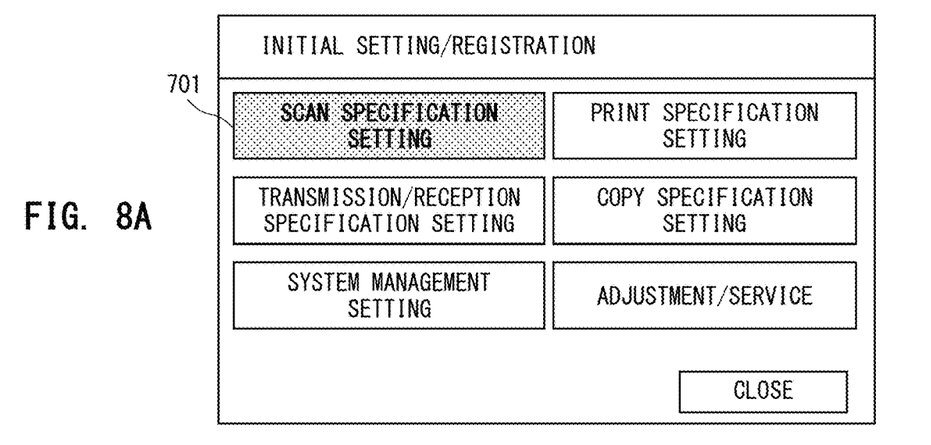
FIG. 8A, FIG. 8B, and FIG. 8C are explanatory views of a registration screen.
Figure 8B:
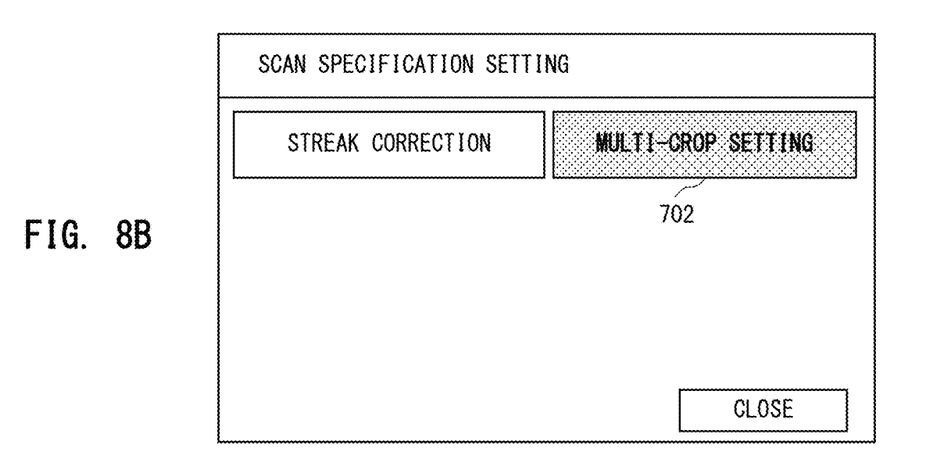
Figure 8C:
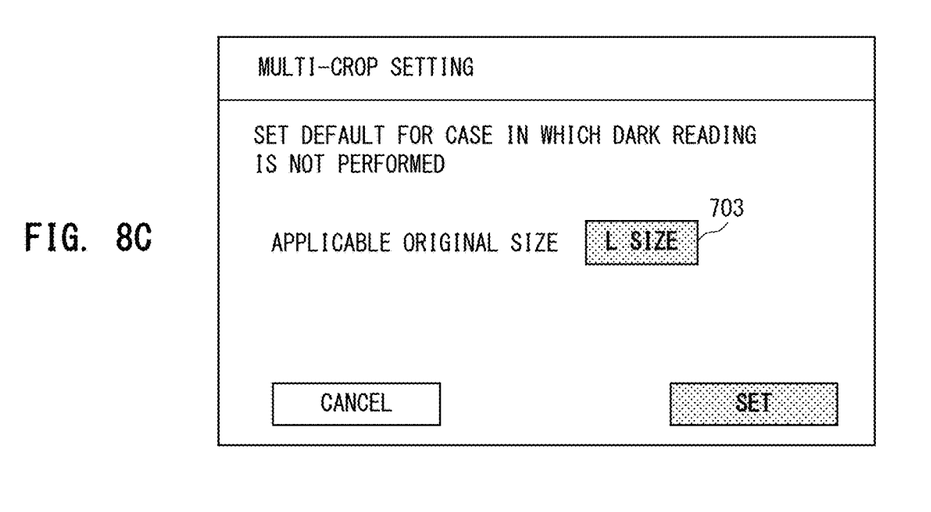

FIG. 8A, FIG. 8B, and FIG. 8C are explanatory views of a registration screen for registering the size of the original to be extracted in the multi-crop mode. Each screen is displayed on the operation display 2002 by the CPU 2001. FIG. 8A is the view of an initial setting/registration screen for illustrating exemplary items that can be set and registered in the image forming system 1001. In a case where the user selects a "scan specification setting" button 701 from the initial setting/registration screen, a scan specification setting screen of FIG. 8B is displayed. In a case where the user selects a "multi-crop setting" button 702 from the scan specification setting screen, a multi-crop setting screen of FIG. 8C is displayed.

Figure 9:
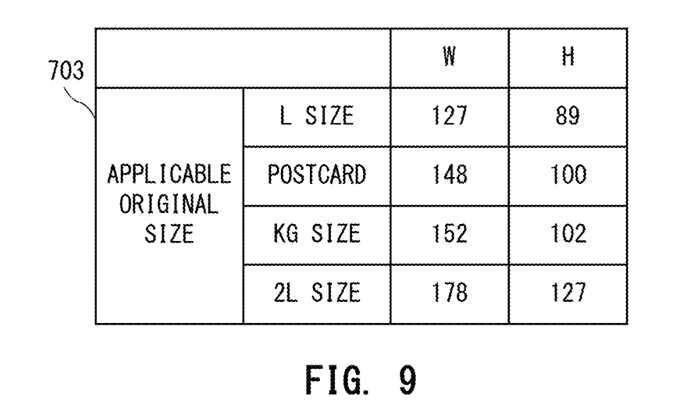
FIG. 9 is an exemplary table of original sizes that can be set.

On the multi-crop setting screen, an applicable original size 703 of the original to be read in the multi-crop can be set. FIG. 9 is an exemplary table of original sizes that can be set by the applicable original size 703. With the applicable original size 703, it is possible to register the size of the original to be read from among regular sizes. FIG. 9 shows a list of options to be displayed as the applicable original size 703 and pieces of internal information to be set in a case where each option is selected. For example, in a case where an L size (i.e., 3R size) is selected, a long-side length (W) of 127 mm and a short-side length (H) of 89 mm are set as the internal information.

Figure 10:
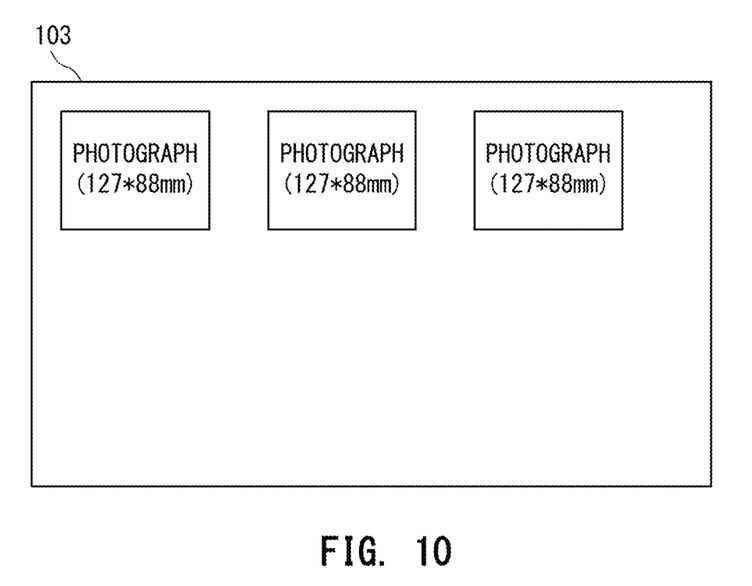
FIG. 10 is an explanatory view of a plurality of originals placed on a platen.

FIG. 10 is an explanatory view of a plurality of originals placed on the platen 103. In a case where a plurality of originals are read at a time in the multi-cropping, ranges of the individual originals are extracted from the read image by the image processing, and the image signals representing the images of the respective originals are output. At this time, in a case where the applicable original size 703 is set through the screen of FIG. 8C, the CPU 2001 extracts an image of the set original size from the read image. For example, in a case where the L size is set, the CPU 2001 extracts an image of the L size (127 mm×89 mm) from the read image. Further, the CPU 2001 processes a plurality of other originals in the same manner to extract images of the selected applicable original size 703.

In the example described above, ranges of images of originals to be extracted are set by setting in advance the size in the multi-crop mode through the operation display 2002, but a method of setting the extraction range of the image of each original may be another method. For example, the extraction range of the image of each original may be set based on model number information on commercially available photographic paper or photo paper used for the photographic original. Further, the range of the image of each original may be extracted based on a result of actually placing a photographic original on the platen 103 and measuring outer dimensions of the photographic original itself.

With the image reading apparatus 1005 according to the at least one embodiment as described above, in a case where an original that requires maintained image quality, such as the photographic original, is to be read in the multi-cropping, the amount of light to be emitted is set to the same level as that set at a time of normal image reading, and the reading processing is performed without reducing the light amount. In a case where an original for which image quality is not important, such as the text original, is to be read in the multi-cropping, the amount of light to be emitted is reduced from that set at the time of the normal image reading, and the reading processing is performed by the dark reading. In a case where the amount of light to be emitted is changed depending on the type of the original in this manner, even in the multi-cropping, it is possible to read the image from each original under optimal conditions irrespective of whether the original is an original for an edge detection purpose or an original for which tone characteristics are taken into consideration.

The operation display 2002 may be provided on the image reading apparatus 1005 side. In this case, the image reading apparatus 1005 functions as, for example, a standalone scanner. Further, the operation display 2002 may be provided to an external device connected to the image forming system 1001 through a network.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-000653, filed Jan. 5, 2023, which is hereby incorporated by reference herein in its entirety.

What is claimed is:

1. An image reading apparatus comprising:
   a platen on which an original is to be placed;
   a scanner unit configured to emit light to the original placed on the platen and receive light reflected from the original, to thereby read an image of the original;
   at least one processor configured to control the scanner unit to generate an image signal representing the image based on a result of reading the image of the original by the scanner unit, and
   determine whether a multi-crop mode is enabled
   wherein, in a case in which the multi-crop mode is not enabled, the at least one processor is configured to control the scanner unit to emit the light with a predetermined light amount, and
   wherein, in a case in which the multi-crop mode is enabled, and a plurality of originals are placed on the platen, the at least one processor is configured to control the scanner unit to:
      emit the light with a first light amount in a case where the plurality of originals are originals having a first type, and
      emit the light with a second light amount in a case where the plurality of originals are originals having a second type which is different from the first type,
   wherein the original having the second type is smaller in thickness than the original having the first type, or the original having the second type is a text original and the original having the first type is a photographic original.

2. The image reading apparatus according to claim 1, wherein the scanner unit includes:
   a light source configured to emit light to the original placed on the platen; and
   a line sensor configured to receive the reflected light, to thereby read the image of the original.

3. The image reading apparatus according to claim 2, further comprising a pressing plate provided so as to be openable and closable with respect to the platen,
wherein the pressing plate is configured to press down the original placed on the platen by being brought into a closed state at a time of reading the original.

4. The image reading apparatus according to claim 1, further comprising an input interface for designating a type of the original,
wherein the at least one processor is configured to control the scanner unit to emit the light with any one of the first light amount or the second light amount based on the type of the original designated through the input interface.

5. The image reading apparatus according to claim 1, wherein the at least one processor is configured to control the scanner unit to emit the light with the first light amount in a case where a sheet used for the original has a paper thickness larger than a predetermined paper thickness, and control the scanner unit to emit the light with the second light amount in a case where the sheet used for the original has a paper thickness equal to or smaller than the predetermined paper thickness.

6. The image reading apparatus according to claim 1, wherein the at least one processor is configured to control the scanner unit to emit the light with the first light amount in a case where a photographic image is printed on the original, and control the scanner unit to emit the light with the second light amount in a case where a character is printed on the original.

7. The image reading apparatus according to claim 1, wherein the at least one processor is configured to control the scanner unit to read the plurality of originals placed on the platen at a time, and generate a plurality of image signals representing images of the respective plurality of originals from a result of reading the plurality of originals by the scanner unit.

8. The image reading apparatus according to claim 7, wherein the at least one processor is configured to extract individual images of the respective plurality of originals from the result of reading the plurality of originals, and generate a plurality of image signals representing the extracted images.

9. The image reading apparatus according to claim 8, further comprising an input interface for designating a size of the original,
wherein the at least one processor is configured to extract, based on the designated size, individual images of the respective plurality of originals from the result of reading the plurality of originals.

10. The image reading apparatus according to claim 9, wherein the input interface is configured to allow a regular size to be designated.

11. The image reading apparatus according to claim 1, wherein the second light amount is less than the first light amount.

12. An image forming system comprising:
an image forming apparatus configured to form an image on a sheet; and
an image reading apparatus configured to read an image from an original, and generate an image signal representing the read image,
wherein the image forming apparatus is configured to acquire the image signal from the image reading apparatus, and form, on the sheet, an image based on the acquired image signal,
wherein the image reading apparatus includes:
a platen on which an original is to be placed;
a scanner unit configured to emit light to the original placed on the platen and receive light reflected from the original, to thereby read an image of the original;
at least one processor configured to control the scanner unit to generate an image signal representing the image based on a result of reading the image of the original by the scanner unit, and
determine whether a multi-crop mode is enabled
wherein, in a case in which the multi-crop mode is not enabled, the at least one processor is configured to control the scanner unit to emit the light with a predetermined light amount, and
wherein, in a case in which the multi-crop mode is enabled, and a plurality of originals are placed on the platen, the at least one processor is configured to control the scanner unit to:
emit the light with a first light amount in a case where the plurality of originals are originals having a first type, and
emit the light with a second light amount in a case where the plurality of originals are originals having a second type which is different from the first type,
wherein the original having the second type is smaller in thickness than the original having the first type, or the original having the second type is a text original and the original having the first type is a photographic original.

* * * * *